(12) United States Patent
Banat et al.

(10) Patent No.: US 10,836,842 B2
(45) Date of Patent: Nov. 17, 2020

(54) PROCESS FOR CONTINUOUS POLYMERIZATION OF OLEFIN MONOMERS IN A REACTOR

(71) Applicant: SABIC Global Technologies B.V., Bergen op Zoom (NL)

(72) Inventors: Yahya Banat, Geleen (NL); Moughrabiah Wajeeh, Riyadh (SA)

(73) Assignee: SABIC Global Technologies B.V., Bergen op Zoom (NL)

( * ) Notice: Subject to any disclaimer, the term of this patent is extended or adjusted under 35 U.S.C. 154(b) by 197 days.

(21) Appl. No.: 15/755,633

(22) PCT Filed: Aug. 18, 2016

(86) PCT No.: PCT/EP2016/069591
§ 371 (c)(1),
(2) Date: Feb. 27, 2018

(87) PCT Pub. No.: WO2017/032683
PCT Pub. Date: Mar. 2, 2017

(65) Prior Publication Data
US 2018/0251577 A1 Sep. 6, 2018

Related U.S. Application Data

(60) Provisional application No. 62/374,967, filed on Aug. 15, 2016.

(30) Foreign Application Priority Data

Aug. 27, 2015 (EP) ..................................... 15182740

(51) Int. Cl.
*C08F 2/01* (2006.01)
*B01J 8/00* (2006.01)
(Continued)

(52) U.S. Cl.
CPC ................ *C08F 2/01* (2013.01); *B01J 8/0025* (2013.01); *B01J 8/0055* (2013.01); *B01J 8/08* (2013.01);
(Continued)

(58) Field of Classification Search
CPC .. C08F 210/16; C08F 2/01; C08F 2/34; C08F 210/06; C08F 2/00; B01J 8/0025;
(Continued)

(56) References Cited

U.S. PATENT DOCUMENTS 2,602,647 A 7/1952 Miller
2,979,492 A * 4/1961 Governale ........... B01J 19/1881
526/344.2

(Continued)

FOREIGN PATENT DOCUMENTS

EP 0089691 A2 9/1983
EP 1764378 A1 3/2007
(Continued)

OTHER PUBLICATIONS

Hamielec et al.;"Polymerization Reaction Engineering—Metallocene Catalysts", Prog. Polym. Sci., 1996, vol. 21, pp. 651-706.
(Continued)

*Primary Examiner* — Ronald Grinsted
(74) *Attorney, Agent, or Firm* — Cantor Colburn LLP

(57) ABSTRACT

The invention relates to a process and system for the continuous polymerization of one or more α-olefin monomers comprising the steps of: (a) withdrawing fluids from a reactor (b) cooling fluids comprising the withdrawn fluids with a cooling unit (c) introducing the cooled fluids to a separator to separate at least part of the liquid from these fluids to form a liquid phase and a gas/liquid phase (d) introducing the gas/liquid phase below to the reactor below
(Continued)

a distribution plate (e) introducing the liquid phase to a settling tank to separate liquid from fines that settle down in the settling tank (f) introducing liquid from the settling tank up stream of the cooling unit.

19 Claims, 1 Drawing Sheet

(51) Int. Cl.
*B01J 8/08* (2006.01)
*B01J 8/18* (2006.01)
*B01J 8/24* (2006.01)
*C08F 2/34* (2006.01)
*C08F 210/16* (2006.01)

(52) U.S. Cl.
CPC ............... *B01J 8/18* (2013.01); *B01J 8/1836* (2013.01); *B01J 8/24* (2013.01); *C08F 2/34* (2013.01); *C08F 210/16* (2013.01)

(58) Field of Classification Search
CPC ..... B01J 8/0055; B01J 8/08; B01J 8/18; B01J 8/1836; B01J 8/24
USPC .......................................................... 526/88
See application file for complete search history.

(56) References Cited

U.S. PATENT DOCUMENTS

| | | | |
|---|---|---|---|
| 3,254,070 A | 5/1966 | Roelen | |
| 3,298,792 A | 1/1967 | Drusco | |
| 4,518,750 A | 5/1985 | Govoni et al. | |
| 4,933,149 A | 6/1990 | Rhee et al. | |
| 5,143,705 A | 9/1992 | Platz | |
| 5,381,827 A | 1/1995 | Koura et al. | |
| 5,627,243 A | 5/1997 | Hamalainen et al. | |
| 5,698,642 A * | 12/1997 | Govoni ................. | B01J 8/1863 526/65 |
| 6,391,985 B1 | 5/2002 | Goode et al. | |
| 6,403,730 B1 | 6/2002 | Mutsers | |
| 7,226,565 B2 | 6/2007 | Knauer et al. | |
| 8,354,483 B2 | 1/2013 | Bergstra et al. | |
| 2010/0273971 A1 | 10/2010 | Bergstra et al. | |

FOREIGN PATENT DOCUMENTS

| | | |
|---|---|---|
| WO | 0044792 A1 | 8/2000 |
| WO | 0069552 A1 | 11/2000 |
| WO | 0240146 A1 | 5/2002 |

OTHER PUBLICATIONS

International Search Report for International Application No. PCT/EP2016/069591; dated Oct. 10, 2016, 3 pages.

Peacock, "Handbook of Polyethylene: Structures, Properties, and Applications", 2000, pp. 61-62.

Written Opinion of the International Search Report for International Application No. PCT/EP2016/069591; dated Oct. 10, 2016, 4 pages.

* cited by examiner

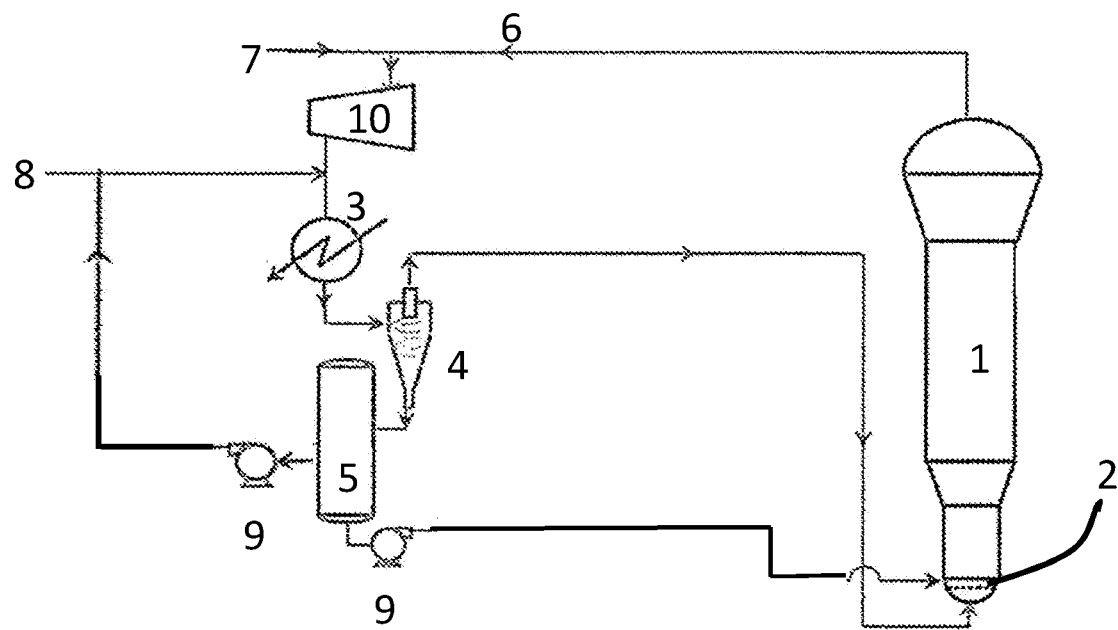

PROCESS FOR CONTINUOUS POLYMERIZATION OF OLEFIN MONOMERS IN A REACTOR

CROSS REFERENCE TO RELATED APPLICATIONS

This application is a 371 of International Application No. PCT/EP2016/069591, filed Aug. 18, 2016, which claims priority to U.S. Application No. 62/374,967, filed Aug. 15, 2016, and European Patent No. 15182740.9, filed Aug. 27, 2015, all of which are incorporated herein by reference in their entirety.

The invention relates to a process for the continuous polymerization of olefin monomers in a reactor, to a reaction system suitable for use in said process and to polyolefins obtainable with said process.

There are many different processes for the polymerization of olefin monomers, including gas-phase fluidized bed processes, slurry, loop or stirred tank reactors, suspension and solution processes.

The discovery of the process for the production of polyolefins in fluidized beds has provided a means for the production of a diverse array of polyolefins such as polyethylene, polypropylene, and polyolefin copolymers. Using a fluidized bed polymerization process substantially reduces the energy requirements as compared to other processes and most importantly reduces the capital investment required to run such a process to produce polymers.

Gas fluidized bed polymerization plants generally employ a continuous cycle. In one part of the cycle, in a reactor a cycling gas stream is heated by the heat of polymerization. This heat is removed in another part of the cycle by a cooling system external to the reactor.

However, gas fluidized bed reactors include various limitations, for example they have a limited heat removal of the heat produced during the exothermic polymerization of the olefin monomers. If heat is not sufficiently removed, various undesired effects occur, such as degradation of the polymerization catalyst, degradation of polyolefin produced, agglomeration of the polyolefin and/or chunking of the polyolefin. Consequently, the overall effect of a limitation in heat removal, is a limitation of the rate of production of the polyolefin.

Consequently, there have been many developments to increase heat removal.

For example, a more efficient way to achieve heat removal is by optionally introducing an inert condensing agent and cooling the gaseous recycle stream to a temperature below its dew point, resulting in the condensation of at least part of the recycle stream to form a bottom recycle stream containing liquid and gas. The thus formed bottom recycle stream is then introduced into the fluidized bed polymerization reactor, where the liquid portion will vaporize upon exposure to the heat of the reactor, which vaporization will remove heat from the reactor. This mode of operation is known in the art as a "condensing mode" or "condensed mode" process.

However, the heat removal that can be achieved in such condensed mode is still limited, since the current reactors, reaction systems and processes for the production of polyolefins using a fluidized bed and a condensed mode do not allow large amounts of liquid in the recycle stream as this causes destabilization of the fluidized bed.

For example, EP 89 691 A2 discloses a process for increasing polymer production in a fluidized bed reactor employing an exothermic polymerization reaction by cooling the recycle stream to below its dew point and returning the resultant two-phase fluid stream to the reactor to maintain the fluidized bed at a desired temperature above the dew point of the recycle stream. The inventors of EP 89 691 A2 found that the amount of condensation of liquid in the recycle stream could be maintained at up to about 20 percent by weight.

For example, WO00/44792A1 discloses a continuous process for the manufacture of olefin polymers in a continuous gas phase polymerization reaction wherein monomer, after passage through the fluidized bed, is cooled to a temperature below its dew point to produce a mixture of cold gas and liquid. All or part of the cold gas is introduced into the bottom of the reactor to serve as the fluidizing gas stream for the fluidized bed. Cold liquid separated from the liquid is warmed to form a heated fluid by passing in indirect heat exchange relation with the fluidized bed and the heated fluid is then injected directly into the bed; combined with the fluidizing gas stream; sprayed on top of the bed or combined with gaseous monomer removed from the fluidized bed for cooling.

To increase the production rate, it is therefore desirable to increase the cooling capacity.

Therefore, it is the object of the invention to provide a process for the continuous polymerization of olefin monomers in a fluidized bed reactor, wherein cooling capacity is increased.

This object is achieved by a process for the continuous polymerization of one or more α-olefin monomers of which at least one is ethylene or propylene comprising the steps of:
(a) withdrawing fluids from a reactor
(b) cooling fluids comprising the withdrawn fluids with a cooling unit
(c) introducing the cooled fluids to a separator to separate at least part of the liquid from these fluids to form a liquid phase and a gas/liquid phase
(d) introducing the gas/liquid phase below to the reactor below a distribution plate
(e) introducing the liquid phase to a settling tank to separate liquid from fines that settle down in the settling tank
(f) introducing liquid from the settling tank upstream of the cooling unit.

In this context, liquid phase may for example mean a phase comprising a liquid, whereas gas/liquid phase means may for example mean a stream comprising gas and liquid.

For the avoidance of doubt the term 'fluids' may encompass liquids, gases and mixtures thereof. The term 'liquid phase' may beside liquids, that may preferably for example be substantially free of solid particles and/or especially solid polymer particles, also include liquids containing solid particles, such as slurries. On the other hand, liquid in the sense of the present invention may thereby be preferably substantially free of solid particles and/or especially solid polymer particles, whereby substantially free of solid particles and/or especially solid polymer particles may mean either having a content of solid particles of for example of less than 1.5 wt. %, 1.0 wt. %, preferably less than 0.5 wt. %, and/or comprising solid particles having an average diameter of less than 175 µm, preferably less than 150 µm, further preferred less than 125 µm.

According to the present invention, fluids may thereby be withdrawn from at least one reactor, especially from the top of at least one reactor.

It has been found that by the process of the invention, it is possible to improve the cooling capacity of a cooling unit. This may be for example related to the fact that can be more efficient to cool a liquid and/or mixture of liquid and gas than a gas, especially for example in view of the much higher heat capacity of a liquid. This can contribute to improve the production rate, especially in terms of space-time-yield (especially in terms of weight of polymer produced per unit of volume of reactor space per unit of time) and/or also to operate a fluidized bed reactor reactor in a broader range of conditions in condensed mode or super-condensed mode, especially without the need of an extended/larger cooling unit.

The at least one cooling may thereby especially for example be a cooling unit used to cool fluids comprising fluids withdrawn from at least one reactor, especially for example from the top of at least one reactor.

In an embodiment, liquid from the settling tank may be introduced upstream of the cooling unit in amount corresponding to between 0.5 wt. % to 25.0 wt. % of the recycle stream, preferably between 1.0 wt. % to 15.0 wt. % of the recycle stream, preferably between 2 wt. % to 10 wt. %, preferably between 2.5 wt. % to 9.0 wt. %, even further preferred between 3.0 wt. % to 8.5 wt. %, even further preferred between 4.5 wt. % to 8.0 wt. %, even further preferred between 5.0 wt. % to 7.0 wt. % of the recycle stream.

In an embodiment, liquid from the settling tank may be introduced upstream of the cooling unit for example in amount of between 10 kg/h to 250 kg/h, preferably 20 kg/h to 200 kg/h, further preferred 50 kg/h to 150 kg/h, even further preferred 75 kg/h to 125 kg/h.

That liquid from the settling tank may be introduced upstream of the cooling unit may thereby for example mean that liquid from the settling tank is introduced in such way so as to add it to the fluids to be cooled in the at least one cooling unit, which may be fluids comprising fluids withdrawn from a/the reactor, especially so that that it will enter the cooling unit together with the compressed fluids comprising the fluids withdrawn from the top of a/the reactor. This may be done for example in such way that liquid from the settling tank is introduced in a stream that will join with the compressed fluids comprising the fluids withdrawn from a/the reactor, preferably from the top of a reactor, and/or enter the cooling unit with them and/or that is introduced directly into the cooling unit where it can preferably join the compressed fluids, comprising for example the fluids withdrawn from the top of a/the reactor.

According to the invention, for example one or more α-olefin monomers may be fed to a reactor. Reactor in the sense of the present invention may thereby preferably mean polymerization reactor, especially for example a reactor for gas phase polymerization and/or a fluidized bed reactor and/or a multi-zone reactor.

The one or more α-olefin monomers may be fed to a reactor. A reactor according to the invention may thereby for example be a fluidized bed reactor and/or a multi-zone reactor.

The one or more α-olefin monomers may thereby be fed for example using feeding means such as a pump. The monomers can preferably fed to the reactor for example by adding the monomers to the fluids withdrawn from a/the reactor, preferably from the top of a/the reactor, that may be (re)circulated from the top of the reactor to the mixing chamber region located below the distribution plate Preferably, the one or more α-olefin monomers can be added for example in such amounts that they make up for the one or more α-olefin monomer consumed during the polymerization.

The one or more α-olefin monomers may be fed in one or in multiple feeding streams. For example, one type of olefin monomer, typically ethylene and/or propylene may be comprised in one feed and another type of α-olefin monomer, also referred to herein as the comonomer, may be comprised in another feed.

Withdrawal of the polyolefin from the reactor may be done for example at any position in the area above the distribution plate or at a combination of positions, for example in case of a multi-zone reactor as described herein, the polyolefin may be withdrawn especially for example from the bottom part of a second zone and/or the top part of a second zone and/or the bottom part of a third zone and/or the top part of a third zone. Preferably, in case of multi-zone reactor the polyolefin is withdrawn from the bottom part of the second zone and/or from the bottom part of the third zone.

Polyolefin may be withdrawn from the reactor using any suitable means, for example a polymer discharge system. The polyolefin may be used as such or may be subjected to purification or other end-processing.

Fluids may be withdrawn for example from the reactor, especially from the top of the reactor, using any suitable means, for example a compressor may be used. Withdrawn fluids can especially be for example fluids withdrawn from at least one reactor, preferably for example from the top of at least one reactor. If fluids are withdrawn they may be compressed by a compressor either alone or with other compounds. Withdrawn fluids can thus for example become respectively compressed withdrawn fluids and/or compressed fluids.

With 'continuous polymerization of one or more α-olefins' or 'continuous preparation of polyolefin' is meant herein that one or more α-olefin monomers of which at least one is ethylene or propylene are fed to the multi-zone reactor and polyolefin thus produced is withdrawn for example continuously or semi-continuously, especially through a polymer discharge system or any other suitable system.

In the process according to the invention one of the α-olefin monomers may be for example ethylene or propylene. Other α-olefin monomers may be present. Examples of other α-olefin monomers include for example α-olefins having from 4 to 8 carbon atoms. However, small quantities of α-olefin monomers having more than 8 carbon atoms, for example 9 to 18 carbon atoms, such as for example a conjugated diene, can be employed if desired. Thus it is possible to produce homopolymers of ethylene or propylene or copolymers of ethylene and/or propylene with one of more α-olefin monomers having for example from 4 to 8 carbon atoms as comonomer(s). Preferred α-olefin monomers include but are not limited to but-1-ene, isobutene, pent-1-ene, hex-1-ene, hexadiene, isoprene, styrene, 4-methylpent-1-ene, oct-1-ene and butadiene. Examples of α-olefin monomers having more than 8 carbon atoms that can be copolymerized with an ethylene and/or propylene monomer, or that can be used as partial replacement for α-olefin monomers having from 4 to 8 α-olefin monomers include but are not limited for example to dec-1-ene and ethylidene norbornene.

When the process of the invention is used for the copolymerization of ethylene and/or propylene with α-olefin monomers, ethylene and/or propylene can preferably be used as the major component of the copolymer. For example, the amount of ethylene and/or propylene present in the copolymer is at least 65% by weight, for example at least 70% by weight, for example at least 80% by weight based on the total copolymer.

Operating the reactor in 'condensed mode' may mean for example that a liquid containing stream is used to cool the reactor and introduced in the reactor. The liquid introduced into the reactor to cool the reactor by evaporation may thereby be especially for example a non polymerizable liquid alkane and/or a mixtures of two or more of such compounds, such as especially for example isopentane and/or n-hexane.

A distribution plate in the reactor may be any device that is suitable for distributing the bottom recycle stream in the reactor, especially suitable to keep a fluidized bed in a second zone of a multi-zone reactor, and/or to serve as a support for a quiescent bed of the solid polymerization catalyst and polyolefin when the reactor is not in operation. For example, the distribution plate may be a screen, slotted plate, perforated plate, a plate of the bubble-cap type, or other conventional or commercially available plate or other fluid distribution device. An example of a commonly used type of distribution plate is a perforated plate with some above-hole structure on top of each hole, to prevent particle sifting.

The distribution plate may generally be positioned perpendicular to the longitudinal axis of a reactor, wherein the fluidized bed is located above said distribution plate and a mixing chamber region below the distribution plate, whereby the mixing chamber region located below the distribution plate may correspond to the first zone of a multi-zone reactor.

The distribution plate is used for achieving good gas distribution. It may be a screen, slotted plate, perforated plate, a plate of the bubble-cap type, or the like. The elements of the plate may all be stationary or the plate may be of the mobile type disclosed for example in U.S. Pat. No. 3,298,792. Mechanically swept distribution grids are moreover for example described in U.S. Pat. No. 3,254,070. Whatever its design, the distribution plate may diffuse the recycle fluid through the particles at the base of the bed to keep the bed in a fluidized condition and also serve to support a quiescent bed of resin particles when the reactor is not in operation.

For purpose of this invention, the preferred type distribution plate is generally of the type which is fabricated from metal and which has holes distributed across its surface. The holes are normally of a diameter of about one-half inch. The holes extend through the plate and over the holes there are positioned angle caps which are fixedly mounted to the plate. Alternate rows of angle irons are oriented at angles to each other, preferably at 60 degrees, in alternate parallel alignment as shown for example in FIG. 4 of U.S. Pat. No. 4,933,149. They serve to distribute the flow of fluid along the surface of the plate so as to avoid stagnant zones of solids. In addition, they prevent resin particles from falling through the holes when the bed is settled or quiescent.

The distribution plate may for example have the shape of a cone, as for example described in U.S. Pat. No. 2,602,647A1, hereby incorporated by reference, which describes a conical distribution plate having a ported central conical section and a ported outer annular conical section, the ports in said central conical section and said annular conical section being circumferentially offset so as to provide a substantial deflecting surface on said central section extending to the ports in the annular section.

Other conical shapes of the distribution plate are for example described in U.S. Pat. No. 4,518,750, hereby incorporated by reference, which describes a distributor of fluidization gases which comprises a double cone body consisting of: (a) a lower conical element, arranged with the vertex turned downwards, provided with more than two ribs on the lateral surface, said ribs having such a profile as to form, together with the wall of the containing shell, flow channels with a decreasing cross-section in an upward direction so that the velocity of the gas will increase gradually and correspondingly, the ribs being arranged diametrically opposite to each other with an axial symmetry and with an inclination with respect to the vertical such as to impart to the inflowing gas current a tangential component, the profile and inclination of the ribs being such as to allow the passage of the solid particles entrained by the inflowing gas, and so as to hinder the falling back of the particles of the fluidized bed whenever the feeding in of the gas is interrupted; and of (b) an upper conical element, with its vertex turned upwards, superimposed onto the lower conical element and having the function of activating the circulation of the solid in the fluidized bed, eliminating the dead or stagnation zones, said process being further characterized in that the distributor in the fluid bed reactor in which it is carried out comprises devices for recycling of the gas, which distributor and the recycling devices allow the passage of the solid particles of the fluidized material entrained by the recycling gas.

For example, U.S. Pat. No. 5,143,705, hereby incorporated by reference, also describes a conical distribution plate with its apex pointing upwardly, wherein said conical distributon plate has a plurality of openings.

For example, U.S. Pat. No. 7,226,565B2, hereby incorporated by reference, discloses a distribution plate having a plurality of gas flow orifices whose outlet sides are sidened conically, said outlet sides being wider than the inlet sides.

For example U.S. Pat. No. 5,627,243, hereby incorporated by reference, discloses a cap-like low control elements formed by a cone with a surface of revolution having its tip pointed upward. The conical surface of the flow control element is provided with performation which is arranged substantially evenly divided on all side surfaces of the element.

For example, U.S. Pat. No. 5,381,827 discloses a gas distributor for use in a gas phase polymerization apparatus having an agitator in a fluidized bed polymerization reactor, the gas distributor being characterized in that the distributor has holes each covered with a cap from above, the cap having an opening oriented in a substantially horizontal direction at an angle of about 90 to 135° with, and outwardly of, a tangent to a circle centered about the center of the reactor.

Preferably, in the invention, the distribution plate may comprise a conical shape.

In addition to the distribution plate, the reactor may be further equipped with other means for agitation, such as mechanical agitation, for example a stirrer. However, preferably, the reactor does not comprise mechanical agitation.

After being withdrawn, especially for example using a compressor, the withdrawn fluids may be cooled, especially for example to below the dew point, of the withdrawn fluids using a cooling unit by any suitable cooling means, especially for example a heat exchanger, especially a heat exchanger working with cooling water. Cooling may thereby be performed for example to a temperature well below the dew point of the withdrawn fluid, especially for example between 5° C. to 40° C. below the dew point, preferably between 10° C. to 35° C. below the dew point, further preferred between 20° C. to 30° C. below the dew point. The dew point may thereby be increased, especially before and/or during the cooling, for example by increasing the operating pressure of the fluids to be cooled and/or by increasing the percentage of condensable fluids and simultaneously decreasing the percentage of non-condensable gases in the fluids to be cooled. The cooling is performed for example so as to condensate at least a part of the withdrawn fluids to get at least one condensed liquid phase and an gas/liquid phase that are both introduced into the separator to separate them. The liquid phase may thereby for example correspond to and/or comprise a mixture of liquefied of alkanes and/or monomer(s).

One or more olefin monomers and/or other fluids, such as for example hydrogen, an inert gas and/or liquid, for example a condensable non-reactive monomer, may be added to the withdrawn fluids to make up for reacted fluids before cooling the resulting fluids comprising the withdrawn fluids to below the dew point using a cooling unit. One or more olefin monomers and/or other fluids, such as for example hydrogen, an inert gas and/or liquid, for example a condensable non-reactive monomer, may be added to the withdrawn fluids to get fluids comprising the withdrawn fluids.

The at least a part of the withdrawn fluids, namely especially the gas/liquid phase obtained in the separator, may be (re)introduced in the reactor below the distribution plate as a bottom recycle stream, especially in the mixing chamber that may correspond to the first zone of a multi-zone reactor to form a bottom recycle stream. This (re) introduction of the the gas/liquid phase into the reactor may be done in any possible way especially for example also via corresponding pipes and/or via other units and/or via additional reactors either alone and/or in combination with other (additional) fluids (such as for example monomer and/or hydrogen) and/or even (additional) solids (such as for example solid polymer particles and/or solid catalyst particles).

Introduction of the bottom recycle stream under the distribution plate may be done using any suitable means for introducing fluids, for example using injection nozzles.

A separator according to the present invention may be any unit that can separate at least a part of the liquid from the cooled fluids and especially that can separate the cooled fluids into a liquid phase and/or a liquid phase with solid polymer particles, which may be a slurry, and a gas/liquid phase.

A separator according to the present invention may be for example a vessel, preferably a large vessel, which reduces the velocity of withdrawn fluids and/or especially of a (withdrawn) gas/liquid stream, whereby preferred at least one liquid phase can be separated from the gas/liquid phase. A separator according to the present invention may be especially for example a hydrocyclone, a cyclone, wet scrubber and a centrifuge, any of which may optionally be combined with a flow deflector and/or a spinner.

Preferably, a hydrocyclone can be used. Hydrocyclones are thereby commercially available. Due to a tangential inlet of the cooled fluids in a hydrocyclone, that may be used as a separator, so that a portion of condensed liquid together with fines may be separated from the gas/liquid phase by a centrifugal effect. This can for example increase the amount of condensed liquid gattered from the withdrawn fluids. This may also allow to gather most of the fines contained in the withdrawn fluids at the bottom of the separator, so as to lead them together with a part of the liquid phase to a settling tank.

The separator may achieve separation by using one or more baffles, for example which baffles are placed near the point of introduction of the bottom recycle stream into the multi-zone reactor. The presence of said baffle or baffles may cause (at least part of the) condensed liquid in the bottom recycle stream to coalescent in the form of liquid droplets on the baffles, which droplets will then subsequently fall to the bottom part of the separator by gravity.

Therefore, in one embodiment of the invention, the separator may comprise for example one or more baffles.

The separator may have a volume of for example between 0.5 m$^3$ and 40 m$^3$, preferably between 1 and 20 m$^3$, further preferred for example between 5 m$^3$ and 10 m$^3$.

The separator may also comprise for example a demister. Demisters are thereby known in the art.

The separator may further also comprises a reservoir in and/or at the bottom of the separator for collecting of the liquid phase. The reservoir may thereby enable the liquid phase to be collected and may contribute to allow control over the discharge of the liquid phase from separator.

Usually, the residence time in the separator is low, for example, in the range of 0.1 second to 5 minutes, for example from 1 second to 1 minute.

The separator, especially the part of the separator containing the liquid phase with solid polymer particles, which may be a slurry, and/or the bottom of the separator may be connected to a settling tank, so that the liquid phase with solid polymer particles, which may be a slurry, is introduced into the settling tank.

A settling tank may thereby be any unit that allows to separate the liquid phase and/or liquid phase with solid polymer particles, which may be a slurry, obtained in the separator further into a liquid and a slurry that comprises solid particles, especially solid polymer particles. This further separation in the settling tank can thereby happen for example by simply letting the solid particles settle down by gravity at the bottom of the settling tank, while the liquid is collected in the upper portion of the settling tank or in any other suitable way, such as for example using a centrifugation based effect. The process according to the invention can also help to reduce distributor plate fouling by contributing to remove fine polymer particles, which may also be called "fines", from the reactor.

In a preferred embodiment, the reactor according to the present invention may be a multi-zone reactor suitable for the continuous fluidized bed polymerization of one or more α-olefin monomers of which at least one is ethylene or propylene, which multi-zone reactor may be operable in condensed and/or super-condensed mode, which multi-zone reactor may comprise for example a first zone, a second zone, a third zone, a fourth zone and a distribution plate.

When a multi-zone reactor is used the high(er) flow (higher superficial gas velocity) inside the multi-zone reactor allows to inject more liquid to the reactor, without having problems especially for example with pooling and/or the wetting of polymer particles. The increase of the cooling capacity and/or cooling efficiency of the cooling unit by the present invention thereby allows to recover more liquids from the stream withdrawn at the top of the fluidized bed reactor, so that more liquid is available to be injected in the reactor and thus to significantly improve for example cooling as well as time-space-yield of the reactor. The synergy between the improved capacity and/or efficiency of the cooling unit and the use of a multi-zone reactor can thus very advantageously be used to increase time-space-yield of the reactor in a simple and efficient way, especially for example without a need for a bigger and/or better and/or redesigned cooling unit.

The first zone, that may correspond to the mixing chamber below the distribution plate, may thereby be separated from the second zone, that may be located above the distribution plate and may comprise at least a part of the fluidized bed, by the distribution plate, wherein the multi-zone reactor is extended in the vertical direction The second zone of the multi-zone reactor may thereby be located above the first zone, the third zone of the multi-zone reactor may be located above the second zone, and the fourth zone of the multi-zone reactor may be located above the third zone The second zone of the multi-zone reactor may contain an inner wall, wherein at least part of the inner wall of the second zone is either in the form of a gradually increasing inner diameter or a continuously opening cone, wherein the diameter or the opening increases in the vertical direction towards the top of the multi-zone reactor.

The third zone may also contain an inner wall, wherein at least part of the inner wall of the third zone is either in the form of a gradually increasing inner diameter or a continuously opening cone, wherein the diameter or the opening increases in the vertical direction towards the top of the multi-zone reactor.

The largest diameter of the inner wall of the third zone may thereby by larger than the largest diameter of the inner wall of the second zone.

In some embodiments, the reactor according to the invention may thereby be a multi-zone reactor that may comprise at least a part of said second zone and/or said third zone contains an inner wall, wherein at least part of the inner wall has a cylindrical shape. The inner wall of the reactor may be the inner envelope delimiting the reactor.

In the context of the present invention, a gradually increasing diameter may for example mean an increase of the diameter of the inner wall of the reactor in the vertical direction towards the top of the reactor. Said increase may be for example stepwise, constant, logarithmic or exponential. One example of such is a continuously opening cone In the context of the present invention, a continuously opening cone may for example mean a conically shaped part of the inner wall of the reactor comprising a first circular opening and a second circular opening connected via the inner wall of the reactor, in which the derivative of the diameter variation of the wall as measured in the vertical direction towards the top of the reactor may preferably have a constant and positive value.

In some embodiments of the invention, the zone, preferably for example the second zone, in the area directly above the distribution plate is either in the form of a gradually increasing inner diameter or a continuously opening cone. In the context hereof, directly above may mean for example that a zone in the form of a gradually increasing inner diameter or a continuously opening cone, wherein the diameter or the opening increases in the vertical direction towards the top of the multi-zone reactor is located relative to the distribution plate, so that accumulation of liquids on the surface of the distribution plate may preferably be prevented.

An advantage of using a multi-zone reactor as reactor may be that it is possible to produce the polyolefin in the same multi-zone reactor, without intermediate separation of the products obtained in the different zones. This is opposed to the reaction systems known so far that contain multiple unit operations and require separation steps in between the units. Therefore, the invention may provide the possibility of shorter cycle times for the production of the polyolefin and is easier to operate.

With a 'multi-zone reactor suitable for the continuous polymerization of one or more α-olefin monomers of which at least one is ethylene or propylene' a device capable of containing and controlling the polymerization of the one of more α-olefin monomers and which device can comprise a fluidized bed may be meant. The multi-zone reactor of the invention can thereby be for example closed off at the top and the bottom by a hemisphere.

With 'fluidized bed' as used herein may be meant that an amount of solid particles (in this case preferably the solid catalyst and/or the solid catalyst to which one or more α-olefin monomers of which at least one is ethylene or propylene is attached) in a solid/fluid mixture acts as a fluid. This can be achieved by placing the amount of solid particles under appropriate conditions, for instance by the introduction of fluid through the solid particles at a high enough velocity to suspend the solid particles and causing them to behave as a fluid.

The first zone of the multi-zone reactor, which may correspond to the mixing chamber, may be separated from the second zone by a distribution plate, and is located below the second zone of the multi-zone reactor.

In the first zone, a separation and distribution of the gas and liquid may take place, which is the primary function of the first zone. The first zone may further comprise a flow deflector associated with the entry conduit for providing the bottom recycle stream to prevent the accumulation of solids and liquids in the first zone. Such flow deflector is for example described in (the figures of) U.S. Pat. No. 4,933,149, hereby incorporated by reference.

The second zone may contain for example an inner wall, wherein at least part of the inner wall of the second zone is either in the form of a gradually increasing inner diameter or a continuously opening cone, wherein the diameter or the opening increases in the vertical direction towards the top of the multi-zone reactor. This leads to a variation of the superficial gas velocity at least in a part of the second zone, since superficial gas velocity depends on the circular cross-sectional surface inside the reactor. This allows to reduce superficial gas velocity in the vertical direction towards the top of the multi-zone reactor, so that the average residence time of polymer particles in the second zone can be increased as a result.

The continuously opening cone or gradually increasing inner diameter of the second zone may be preferably for example located in the lower part of the second zone, more preferably is located directly above the distribution plate.

The second zone may comprise (part of) the fluidized bed where gas phase or gas-liquid polymerization may take place. The second zone is suitable for gas-liquid polymerization (under turbulent fluidization conditions). Turbulent fluidization conditions are for example described in U.S. Pat. No. 6,391,985, whereby the relevant passages on turbulent fluidization are hereby incorporated by reference.

In one embodiment of the invention, a gas-liquid polymerization may be conducted in the second zone and a gas phase polymerization may be conducted in the third zone.

The third zone of the multi-zone reactor is located above the second zone of the multi-zone reactor. The third zone contains an inner wall, wherein at least part of the inner wall of the third zone is either in the form of a gradually increasing inner diameter of a continuously opening cone, wherein the diameter or the opening increases in the vertical direction towards the top of the multi-zone reactor. This leads to a variation of the superficial gas velocity at least in a part of the third zone, since superficial gas velocity depends on the circular cross-sectional surface inside the reactor. This allows to reduce superficial gas velocity in the vertical direction towards the top of the multi-zone reactor, so that the average residence time of polymer particles in the third zone can be increased as a result.

By using the multi-zone reactor, for example a gas-liquid polymerization may take place in the second zone and a gas-phase polymerization may then occur in the third zone. Therefore, the invention may provide a two-stage polymerization or multi-stage polymerization in different zones.

The top zone or fourth zone may be a disengagement zone and/or gas expansion zone, designed so that the superficial gas velocity in that zone preferably may hinder polymer particles to reach and/or stay in that zone. It has the function to disengage the reaction mixture and the polymer product of the reaction. Accordingly, this zone does preferably for example not function as a reaction zone.

In case of a continuously opening cone or gradually increasing inner diameter, a continuously opening cone or gradually increasing inner diameter may extend, preferably continuously, from the second into the third zone and/or optionally also from the third into the fourth zone. In this case, on continuously opening cone or gradually increasing inner diameter may form the different zones located therein.

However, the shape of the continuously opening cone or gradually increasing inner diameter of the third zone may also have a shape that is different from the continuously opening cone or gradually increasing inner diameter of the second zone. The continuously opening cone or gradually increasing inner diameter of the third zone may be located in any part of the third zone, for example in the lower or in the upper part of the third zone, but is preferably located in the lower part of the third zone.

The third zone may comprise part of the fluidized bed and/or may b suitable for gas-phase polymerization.

The third zone and the second zone can be distinguished preferably when the multi-zone reactor is operated; however there may be no sharp boundary between the second and third zone. Typically, when operating the multi-zone reactor, the second zone will comprise more liquid than the third zone and in the third zone, in which a gas-phase polymerization may take place.

The top zone of the multi-zone reactor, which is for example the fourth zone of the multi-zone reactor is located above the third zone. The top zone or fourth zone is not intended for gas-phase polymerization, but instead may be for example suitable for gas expansion. It has the function to disengage the reaction mixture and the polymer product of the reaction. Accordingly, this zone does not function as a reaction zone. The superficial gas velocity may be of such low value in that zone that polymer particles preferably do not enter into the top zone, preferably at least so that the fluids withdrawn for example at the top of the reactor are sufficiently free of particles to avoid clogging to occur in the compressor.

In such multi-zone reactor, during the course of polymerization, fresh polymer particles are produced by catalytic polymerization of α-olefin monomers. Such polymer particles are projected upwards in the direction of the fourth zone through the circulating gas. Most of these particles do preferably not reach the fourth zone or return to the second or third zone by gravity as the superficial velocity decreases in the fourth zone. The fourth zone may be connected to the third zone or optional further zone(s).

The multi-zone reactor of the invention may comprise further zones, such as for example one, two or even optionally three further zones, that can for example be a fifth zone and optionally a sixth zone and optionally even a seventh zone. These zones may provide a further possibility for polymerization, wherein each further zone may be operated at different reaction conditions. These further zones can be located preferably between the third zone and the top zone.

With inner diameter is meant the diameter in a given horizontal plane perpendicular to the center line of the multi-zone reactor as measured from the inside of the inner wall of the multi-zone reactor.

For example, the maximum inner diameter of the fourth zone can be for example at least 1%, at least 3%, at least 5% and/or at most 300%, at most 200%, at most 150%, at most 80%, at most 70%, at most 60%, for example at most 50%, at most 40%, at most 30%, at most 25%, at most 20%, at most 15% larger than the maximum inner diameter of the third zone. For example, the maximum inner diameter of the fourth zone can be for example from 5 to 30% larger than the maximum inner diameter of the third zone.

For example, the maximum inner diameter of the third zone can be for example at least 1%, at least 3%, at least 5% and/or at most 300%, at most 200%, at most 150%, at most 80%, at most 70%, at most 60%, at most 50%, f at most 40%, at most 30%, at most 25%, at most 20%, at most 15% larger than the maximum inner diameter of the second zone. For example, the maximum inner diameter of the third zone may be for example from 15 to 30% larger than the maximum inner diameter of the second zone.

For example, the maximum inner diameter of the second zone may be for example at least 1%, at least 3%, at least 5% and/or at most 300%, at most 200%, at most 150%, at most 80%, at most 70%, at most 60%, at most 50%, at most 40%, at most 30%, at most 25%, at most 20%, at most 15% larger than the maximum inner diameter of the first zone. For example, the maximum inner diameter of the second zone may be for example from 15 to 30% larger than the maximum inner diameter of the first zone.

In one embodiment, the invention may use a multi-zone reactor, wherein at least the bottom part of the third zone comprises an inner wall in the form of a gradually increasing inner diameter or a continuously opening cone, wherein the diameter or the opening increases in the vertical direction towards the top of the multi-zone reactor. In such an embodiment, the bottom part of the second zone and/or of the bottom part of the fourth zone may also comprise an inner wall in the form of a gradually increasing inner diameter or a continuously opening cone, wherein the diameter or the opening increases in the vertical direction towards the top of the multi-zone reactor.

In one embodiment, the second zone in the area directly above the distribution plate may be either in the form of a gradually increasing inner diameter or a continuously opening cone, wherein the diameter or the opening increases in the vertical direction towards the top of the multi-zone reactor and wherein the top part of the second zone has an inner wall having a cylindrical shape and wherein the top part of the second zone is connected to a bottom part of the third zone, wherein the bottom part of the third zone is either in the form of a gradually increasing inner diameter or a continuously opening cone, wherein the diameter or the opening increases in the vertical direction towards the top of the multi-zone reactor and wherein the top part of the third zone has an inner wall having a cylindrical shape and wherein the top part of the third zone is connected to the top zone, for example to the fourth zone.

Preferably, a cone and/or a cylindrical shape may be for example the shape of a right circular cylinder and/or a right circular cone.

Preferably, the angle (α) between the inner wall of the part of the second zone having the gradually increasing inner diameter or having the continuously opening cone, and the other generatrix line of the cone may be for example from 0.1 to 80 degrees, preferably from 1 to 60 degrees, more preferably from 1-45 degrees, most preferably around 27 degrees.

For example, said angle (α) may be at least 5 degrees, for example at least 7 degrees, for example at least 10 degrees, for example at least 20 degrees and/or for example at most 60, for example at most 50, for example at most 40, for example at most 35 degrees, for example at most 30 degrees. For example, the angle (α) is in the range from 10 to 40 degrees.

Preferably, the invention relates to a reactor of the invention, wherein the angle (α) between the inner wall of the part of the third zone having the gradually increasing inner diameter or having the continuously opening cone, and the other generatix line of the cone may be for example from 0.1 to 80 degrees, preferably from 1 to 60 degrees, more preferably from 1-45 degrees, most preferably around 27 degrees, for example from 1 to 40 degrees.

For example, said angle (α) may be for example at least 5 degrees, at least 7 degrees, at least 10 degrees, at least 20 degrees and/or at most 60 degrees, at most 50 degrees, at most 40 degrees, at most 35 degrees, at most 30 degrees. For example, the angle (α) may be in the range from 10 to 40 degrees.

It should be appreciated by the skilled person that due to the fact that the volume in a multi-zone reactor expands from the first zone to the second zone and from the second zone to the third zone and from the third zone to the fourth zone when operating the multi-zone reactor, the superficial gas velocities in these zones will decrease from the first to the second and from the second to the third zone and from the third zone to the fourth zone. For example, the superficial gas velocities in a multi-zone reactor when used to produce polyethylene, for example LLDPE, may be in the range of from 0.7 to 3.5 m/s in the second zone, which may then be reduced to 0.5 to 2 m/s in the third zone, after which the superficial gas velocity may be further reduced in the top zone.

By feeding the fluids that are cooled to below their dew point at least partially (at least the part corresponding to the liquid/gas phase obtained in the separator) back into the first zone of a multi-zone reactor, the liquid/gas phase will be passed from the first zone through the distribution plate into the second zone, resulting in the formation of a fluidized bed and/or a bubble column. Heat generated by the polymerization will cause the liquids to evaporate. The feeding of the solid polymerization catalyst and the one or more α-olefin monomers to the multi-zone reactor will result in the formation of polyolefin, which may be withdrawn from the multi-zone reactor. The fluids withdrawn from the top of the multi-zone reactor may be at least partially recirculated to the reactor below the distribution plate as a bottom recycle stream.

In an embodiment of the process, a polymerization catalyst, which may be especially a solid polymerization catalyst, may for example be fed as a suspension in a solvent, for example a hydrocarbon solvent or the like, or in an inert gas, such as nitrogen or may be fed together with and/or in the form of a solid polymer particles, which may correspond to a prepolymer.

The catalyst may however also be injected as a dry catalyst. For instance, when multi-zone reactor as described herein is used, the polymerization catalyst may be for example also be injected into the second zone as a dry catalyst.

The person skilled in the art is thereby aware of which polymerization catalysts, which may be especially solid polymerization catalyst, may be suitable for continuous polymerization of α-olefin monomers. The system according to the invention may thus comprise at least one catalyst feeding unit, especially at least dry catalyst feeder.

For example, heterogeneous polymerization catalysts, which are catalysts that are supported on an inert substrate, for example silica or alumina may be used. Suitable examples of hetereogeneous catalysts include supported Ziegler Natta and supported metallocene catalysts and combinations thereof, for example in a mixed catalyst system. Examples of a catalyst composition for polymerization of α-olefins comprising at least two catalytic components are for example described in EP1764378A1, hereby incorporated by reference. EP1764378A1 discloses a catalyst composition comprising a metallocene component and a Ziegler-Natta type transition metal component, at least one activator and support material. Metallocene catalysts are for example described by Hamielec and Soares in "Polymerisation reaction engineering-metallocene catalysts" (Prog. Pol. Sci. Vol. 21, 651-706, 1996), hereby incorporated by reference. The solid polymerization catalyst may also be a metal oxide catalyst, for example a chromium oxide catalysts. Such metal oxide catalyst may for example be based on a support of an inert substrate, for example on silica, alumina silicate or alumina, for example on a highly porous support of silica, alumina silicate or alumina as for example disclosed in the "Handbook of Polyethylene" by Andrew Peacock at pages 61-62, hereby incorporated by reference.

The group of metallocene catalysts includes many variations. In the most general form, metallocene catalysts comprise a metal atom, for example titanium, zirconium or hafnium attached to for example four ligands, for example two substituted cyclopentadienyl ligands and two alkyl, halide or other ligands with an optionally modified organoalumoxane as activator, for example methylaluminoxane (MAO) or a compound based on boron. Examples of inert substrates that can be used as support for a metallocene catalyst include inorganic oxides, for example $SiO_2$, $MgCl_2$, $Al_2O_3$, $MgF_2$ and $CaF_2$. Preferably, the solid polymerization catalyst used in the system and process of the invention is a metallocene catalyst supported on silica, for example a silica as commercially available, for example Grace Davison 948 silica or Ineos ES 70 silica.

A Ziegler Natta catalyst may be used together with a cocatalyst in the system and process of the invention. Suitable example of cocatalysts include but are not limited to organo aluminium compounds having formula $AlR_3$, wherein R stands for a hydrocarbon having 1 to 10 C-atoms. Examples of organo aluminium compounds having formula $AlR_3$ include triethylaluminium alkyl, triisobutyl aluminium trialkyl, tri-n-hexyl aluminium and tri octyl aluminium.

Examples of inert substrates that can be used as support for a Ziegler Natta catalyst include inorganic oxides, for example oxides of silica, alumina, magnesium, titanium and/or zirconium; magnesium chloride, clays, zeolites, polystyrene, polyethylene, polypropylene, graphite and/or layered silicates.

It will be clear to the person skilled in the art, that also mixtures of polymerization catalysts may be used in the invention. It will also be clear to the person skilled in the art, that also prepolymer may be used as polymerization catalyst.

In an embodiment of the process according to the present invention, at least a part of the slurry comprising solid polymer particles, which may settle in a portion of the settling tank, especially for example at the bottom of the settling tank, may be (re)introduced into a/the reactor above the distribution plate, especially for example in the fluidized bed and/or in the second zone and/or in the third zone of a multi-zone reactor. Alternatively, at least a part of the slurry comprising solid polymer particles, which may settle in a portion of the settling tank, especially for example at the bottom of the settling tank, may be (re)introduced into a/the reactor below the distribution plate. This (re)introduction of the slurry comprising solid polymer particles into the reactor may thereby be done in any possible way especially for example also via corresponding pipes and/or via other units and/or via additional reactors either alone and/or in combination with other (additional) fluids (such as for example a monomer and/or hydrogen) and/or even (additional) solids (such as for example solid polymer particles and/or solid catalyst). This may be done for example to reduce waste and get the solid polymer particles to polymerize further, especially as these particles may be rich in catalyst.

A slurry comprising solid polymer particles may thereby settle in a portion of the settling tank, while a liquid may settle in another portion of the settling tank. The bottom of the settling tank may thereby preferably correspond to the portion of the settling tank where a slurry comprising solid polymer particles settles, preferably for example by gravity and/or difference in density. On the other hand, the upper portion of the settling tank may preferably correspond to the portion of the settling tank where a liquid settles, preferably for example by gravity and/or difference in density.

Upon introduction of the slurry into the reactor, the solid polymer particles may be present in the slurry comprising solid polymer particles in an amount of for example between 50 wt. % and 99.9 wt. %, preferably between 60 wt. % and 95 wt. %, further preferred between 70 wt. % and 90 wt. % based on the total slurry upon introduction of the slurry into the reactor.

The slurry comprising solid polymer particles may be fed into the reactor for example above the distribution plate, especially directly above the distribution plate and/or in the first zone above the distribution plate, preferably for example into the fluidized bed. The slurry stream may be fed for example at any position into the fluidized bed, but is preferably fed into the lower part of the fluidized bed. Alternatively, the slurry comprising solid polymer particles may be fed into the reactor below the distribution plate.

The introduction of a slurry comprising solid polymer particles to the reactor may thereby allow to avoid problems with statics while introducing solid polymer particles into the reactor.

In the invention, the slurry comprising solid polymer particles may preferably introduced/injected into a multi-zone reactor in a part of the second zone wherein the inner wall is either in the form of a gradually increasing inner diameter or a continuously opening cone or into the part of the third zone wherein the inner wall is either in the form of a gradually increasing inner diameter or a continuously opening cone.

In one embodiment of the invention, the zone in the reactor above the distribution plate (in case of the multi-zone reactor, the second zone) may be divided for example into two or more subzones by one or more substantially vertical partition walls, for example a tube, extending from a point located above the distribution plate to a point located below the gas expansion zone (in case of the multi-zone reactor, the fourth zone) preferably so that a dead zone is prevented.

With 'dead zone' a region where the mixing is insufficient for providing homogeneous reaction resulting in either chunking or melting in the dead zone and/or resin that is outside the desired specifications (off spec) may be meant. Examples of specifications are not limited to desired density, molecular weight, molecular weight distribution and/or melt flow rate.

Such vertical partition walls are sometimes also referred to as 'draft tube'. This is for example described in WO02/40146A1 and in U.S. Pat. No. 6,403,730, for both of which relevant passage regarding specifically the partition walls or "draft tube" are hereby incorporated by reference.

In one embodiment, the reactor may further comprise a moving bed unit, wherein the moving bed unit is provided with an inlet and an outlet which are connected to the the zone in the reactor above the distribution plate (in case of the multi-zone reactor this may be the second zone of the reactor), wherein in said zone shielding means are positioned such that via the outlet of the moving bed unit inflow of gas from said zone is inhibited and outflow of polymerization particles is allowed, wherein preferably the moving bed unit is provided with gas feed means for feeding gas at one or more different levels in the moving bed unit and/or wherein preferably the outlet of the moving bed unit is provided with means for displacing metered quantities of polymer particles from the moving bed unit into the zone above the distribution plate.

US 20100273971 of which relevant passages direct specifically toward the moving bed unit are herewith incorporated by reference, discloses such moving bed unit (also known as 'draught tube'), wherein the moving bed unit is provided with an inlet and an outlet which are connected to the zone of the reactor above the distribution plate, wherein shielding are positioned such that via the outlet of the moving bed unit inflow of gas from the zone above the distribution plate is inhibited and outflow of polymerization particles is allowed.

Such draught tube is also described in U.S. Pat. No. 8,354,483, of which relevant passages regarding the draught tube are herewith incorporated by reference. This document thereby discloses that the moving bed unit is provided with gas feed means for feeding gas at one or more different levels in the moving bed unit and preferably wherein the outlet of the moving bed unit is provided with means for displacing metered quantities of polymer particles from the moving bed unit into the zone above the distribution plate.

In order to maintain a fluidized bed in the processes of the invention, the superficial gas velocity is in the range of 0.5 to 5 m/s. For example, is at least 1, for example at least 1.5, for example at least 2 and/or for example at most 4.5, for example at most 4, for example at most 3.5, for example at most 3 m/s.

The continuous polymerization of one or more α-olefin monomers may produce polyolefins especially for example in the form of particles, herein also referred to as 'polyolefin'. Examples of polyolefins which may thus produced, include a wide variety of polymers, for example polyethylene, for example linear low density polyethylene (LLDPE), which may for example be prepared from ethylene and but-1-ene, 4-methylpent-1-ene or hex-1-ene, high density polyethylene (HDPE), which may for example be prepared from ethylene or from ethylene with a small portion of an α-olefin monomer having from 4 to 8 carbon atoms, for example but-1-ene, pent-1-ene, hex-1-ene or 4-methylpent-1-ene. Other examples include but are not limited to plastomers, elastomers, medium density polyethylene, polypropylene homopolymers and polypropylene copolymers, including random copolymers, and block or multi-block copolymer and ethylene propylene rubber (EPR).

Preferably, in the processes of the invention, the polyolefin produced is a polyethylene, for example linear low density polyethylene or high density polyethylene or a homopolypropylene or propylene-ethylene random copolymer.

The present invention also concerns a system for the continuous polymerization of one or more α-olefin monomers of which at least one is ethylene or propylene whereby a reactor and preferably the top of at least one reactor is connected to the intake of a compressor via a line so to be allow to withdraw fluids from the reactor, preferably at its top, and to carry these withdrawn fluids to the intake of a compressor, so as to allow them to be compressed in the at least one compressor, whereby further an additional line for a first feed of for example a monomer, which may especially be for example ethylene, hydrogen and/or one or more inert gases is also connected to the line leading from the reactor, especially from its top, to the intake of the at least one compressor, so as to allow the compounds of the first feed to also be compressed together with the withdrawn fluids in the at least one compressor, whereby further the output of the compressor is connected via a line to a cooling unit, so as to allow the compressed fluids, which may comprise fluids withdrawn from the reactor, exciting compressor to be cooled in the at least one cooling unit, so that at least one part of these fluids condensates, whereby further a line for a second feed of for example a comonomer and/or a liquid alkane such as for example isopentane and/or one or more recovered liquids is connected to the line between the output of the at least one compressor and the at least one cooling unit, so as to allow the compounds of the second feed to be also cooled by the at least one cooling unit together with the fluids coming from the output of the at least one compressor, whereby further the at least one cooling unit is connected via a line to a separator, so as to allow the cooled fluids from the at least one cooling unit to enter at least one separator to separate these fluids in a liquid phase and a gas/liquid phase, whereby further the at least one separator is connected, for example via its top, to the bottom of the at least one reactor, preferably below the distribution plate, especially to the mixing zone, via a line, so as to be able to introduce the gas/liquid phase to the reactor, especially below the distribution plate, whereby further the at least one separator is moreover connected via a line, especially from its bottom, to a settling tank, so as to allow the liquid phase with solid particles, especially solid polymer particles to be introduced in the at least one settling tank, whereby further the portion of the at least one settling tank where a liquid settles, which may preferably be the upper portion of the at least one settling tank, is connected via a line, especially for example a line with a pump, to the at least one line of the second feed, so as to introduce the liquid from the at least one settling tank, preferably from the upper portion of the at least one settling tank, upstream of the at least one cooling unit and to add it to the fluids to be cooled in the at least one cooling unit.

In an embodiment of the system according to the invention, the portion of the at least one settling tank where a slurry with solid polymer particles settles, which may preferably be the bottom of the settling tank, may be connected via a line, especially a line with a pump, to the reactor, so as to allow the slurry with solid polymer particles to be injected to the reactor, for example below the distribution plate of the reactor and/or above the distribution plate of the reactor, especially for example into the fluidized bed and/or into the second and/or third zone of a multi-zone reactor.

In an embodiment of the system according to the invention, the portion of the at least one settling tank where a liquid settles is connected for example via a line with a pump to the at least one line of the second feed and/or so as to introduce the liquid from the at least one settling tank upstream of the at least one cooling unit and to add it to the fluids to be cooled in the at least one cooling unit, whereby a/the pump may for example allow to dose the amount of liquid from the settling thank that is introduced upstream of the cooling unit.

A system according to the invention may also comprise a polymer discharge, to where produced polymer can be discharged.

A system according to the invention may also comprise a vent gas recovery (VGR) system to recover compounds for example from a product purge bin, wherein compounds may for example be recovered from produced polymer material by a counter flow of an inert gas, such as for example nitrogen, and/or of volatile compounds. The recovered compounds may then for example be cooled down, preferably for example so as to obtain cooled fluid and/or liquid from the recovered compounds, and/or liquid and/or fluid (preferably cooled liquid and/or fluid) obtained from these recovered compounds can be also introduced into the cooling unit. A vent gas recovery system can thereby for example especially be connected for example via a line with a heat exchanger and/or a pump to the second feed and/or so that liquid and/or fluid obtained from these recovered compounds can be also introduced into the cooling unit

DESCRIPTION OF THE FIGURES

FIG. 1 (FIG. 1) is a schematic illustration of an embodiment of the process and a system according to the invention reactor system of the invention using a standard gas-phase reactor that is suitable for the continuous polymerization of one or more α-olefin monomers.

The FIGURE thereby schematically shows a fluidized bed reactor (1) with a distribution plate (2), represented by a dashed line, used a reactor, an heat exchanger (3), a hydrocyclone (4) used as a separator, a settling tank (5), two pumps (9) and a compressor (10). While no other pumps are explicitly shown in FIG. 1 other pumps may be to move fluids around as needed. Even if not shown her the system according to the invention may also comprise a vent gas recovery (VGR) system to recover compounds for example from a product purge bin, the recovered compounds may thereby for be example cooled down and/or liquid obtained from these recovered compounds can be also introduced into the cooling unit for example at feed (8).

The top of fluidized bed reactor (1) is connect to the intake of compressor (10) via a line so to be allow to withdraw fluids (6) from the top of the reactor (1) and to carry them to the intake of the compressor (10), so as to allow them to be compressed in compressor (10). An additional line for a first feed (7) of for example a monomer, which may especially be for example ethylene, hydrogen and/or one or more inert gases is thereby also connected to the line leading from the top of the reactor to the intake of compressor (10), so as to allow these compounds of the first feed (7) to also be compressed together with the withdrawn fluids (6) in compressor (10). The output of compressor (10) is connected via a line to the heat exchanger (3) used as cooling unit, so as to allow the compressed fluids exciting compressor (10) to be cooled in the heat exchanger so that at least one part of these fluid condensates. A line for a second feed (8) of for example a comonomer and/or a liquid alkane such as for example isopentane and/or one or more recovered liquids is connected to the line between the output of compressor (10) and the heat exchanger (3), so as to allow the compounds of the second feed (8) to be also cooled by the heat exchanger (3) together with the fluids coming from the output of compressor (10). The heat exchanger (3) is connected via a line to the hydrocyclone (4) used as separator, so as to allow the cooled fluids from the heat exchanger (3) to enter the hydrocyclone (4) used as separator to separate these fluids in a liquid phase from a gas/liquid phase. The hydrocyclone (4) is connected, for example via its top, to the bottom of reactor, preferably below the distribution plate, especially to the mixing zone, via a line, so as to be able to introduce the gas/liquid phase to the reactor below the distribution plate. The hydrocyclone (4) is moreover connected via a line, especially from its bottom, to a settling tank (5), so as to allow the liquid phase with solid particles, especially solid polymer particles to be introduced in the settling tank (5). The bottom of the settling tank (5), which may preferably be the portion of the settling tank (5) where a slurry with solid polymer particles settles, is thereby connected via a line with a pump (9) to the reactor (1), so as to allow the slurry with solid polymer particles to injected above the distribution plate (2), especially into the fluidized bed and/or into the second and/or third zone of a multi-zone reactor. The upper portion of the settling tank (5), which may preferably be the portion of the settling tank (5) where a liquid settles, is thereby connected via a line with a pump (9) to the line of the second feed (8), so as to introduce the liquid from the settling tank (5), preferably from the upper portion of the settling tank (5), upstream of the heat exchanger (3) used as a cooling unit so as to add it to the fluids to be cooled in the heat exchanger (3).

FIG. 1 also shows a process for the continuous polymerization of one or more α-olefin monomers of which at least one is ethylene or propylene comprising the steps of:
(a) withdrawing fluids (6) from the top of a fluidized bed reactor (1)
(b) cooling fluids comprising the withdrawn fluids with a heat exchanger (3) used as a cooling unit, whereby a feed (7) of for example a monomer, which may especially be for example ethylene, hydrogen and/or one or more inert gases and/or a second feed (8) of for example a comonomer and/or a liquid alkane such as for example isopentane and/or one or more recovered liquids may be added to the withdrawn fluids (6) to form the fluids comprising the withdrawn fluids that are introduced into the heat exchanger (3) used as a cooling unit
(c) introducing the cooled fluids to a hydrocyclone (4) used as separator to separate at least part of the liquid from these fluids to form a liquid phase and a gas/liquid phase
(d) introducing the gas/liquid phase below to the reactor (1) below a distribution plate (2)
(e) introducing the liquid phase to a settling tank (5) to separate liquid from fines that settle down, especially for example by gravity, in the settling tank (5)
(f) introducing the liquid from the settling tank (5), preferably from the upper portion of the settling tank (5), upstream of the heat exchanger (3) used as a cooling unit so as to add it to the fluids to be cooled in there.

The invention claimed is:
1. A process for the continuous polymerization of one or more α-olefin monomers of which at least one is ethylene or propylene comprising the steps of:

(a) withdrawing fluids from a reactor
(b) cooling fluids comprising the withdrawn fluids with a cooling unit
(c) introducing the cooled fluids to a separator to separate at least part of the liquid from these fluids to form a liquid phase and a gas/liquid phase
(d) introducing the gas/liquid phase below to the reactor below a distribution plate
(e) introducing the liquid phase to a settling tank to separate liquid from fines that settle down in the settling tank
(f) introducing liquid from the settling tank upstream of the cooling unit so as to add the liquid from the settling tank to the fluids to be cooled in the cooling unit.

2. The process according to claim 1, wherein, the reactor is a fluidized bed reactor.

3. The process according to claim 1, wherein the cooling unit is a heat exchanger.

4. The process according to claim 1, wherein the separator is a hydro cyclone.

5. The process according to claim 1, wherein the amount of liquid from the settling tank introduced upstream of the cooling unit is between 0.5 wt. % to 25.0 wt. % of the recycle stream or between 10 kg/h to 250 kg/h.

6. The process according to claim 1, wherein a slurry comprising solid polymer particles from the settling tank, is introduced to the reactor below the distribution plate.

7. A system for the continuous polymerization of one or more α-olefin monomers of which at least one is ethylene or propylene whereby
a reactor is connected to the intake of a compressor via a line so as to allow to withdraw fluids from the reactor and to carry these withdrawn fluids to the intake of a compressor, so as to allow them to be compressed in the at least one compressor,
whereby further an additional line for a first feed is also connected to the line leading from the reactor to the intake of the at least one compressor, so as to allow the compounds of the first feed to also be compressed together with the withdrawn fluids in the at least one compressor,
whereby further the output of the compressor is connected via a line to a cooling unit, so as to allow the compressed fluids exiting the compressor to be cooled in the at least one cooling unit, so that at least one part of these fluids condensates,
whereby further a line for a second feed is connected to the line between the output of the at least one compressor and the at least one cooling unit, so as to allow the compounds of the second feed to be also cooled by the at least one cooling unit together with the fluids coming from the output of the at least one compressor,
whereby further the at least one cooling unit is connected via a line to a separator, so as to allow the cooled fluids from the at least one cooling unit to enter at least one separator to separate these fluids in a liquid phase and a gas/liquid phase,
whereby further the at least one separator is connected to the bottom of the at least one reactor via a line, so as to be able to introduce the gas/liquid phase to the reactor,
whereby further the at least one separator is moreover connected via a line to at least one settling tank, so as to allow the liquid phase with solid particles to be introduced in the at least one settling tank,
whereby further the portion of the at least one settling tank where a liquid settles is connected via a line to the at least one line of the second feed and/or so as to introduce the liquid from the at least one settling tank upstream of the at least one cooling unit, so as to add it to the fluids to be cooled in the at least one cooling unit.

8. The system according to claim 7, wherein the portion of the at least one settling tank where a slurry with solid polymer particles settles is connected via a line to the reactor, so as to allow the slurry with solid polymer particles to be injected to the reactor below the distribution plate.

9. The system according to claim 7, wherein the portion of the at least one settling tank where a liquid settles is connected via a line with a pump to the at least one line of the second feed.

10. The system according to claim 7, wherein the system comprises a polymer discharge.

11. The process according to claim 6, wherein the slurry is from the bottom portion of the settling tank.

12. The system according to claim 7, wherein the solid particles in the liquid phase comprise solid polymer particles.

13. The system according to claim 7, wherein the portion of the at least one settling tank where a liquid settles is connected via a line to the at least one line of the second feed.

14. The system according to claim 7, wherein the portion of the at least one settling tank where a liquid settles is connected via a line with a pump so as to introduce the liquid from the at least one settling tank upstream of the at least one cooling unit and to add it to the fluids to be cooled in the at least one cooling unit.

15. The system according to claim 7, wherein the portion of the at least one settling tank where a liquid settles is connected via a line so as to introduce the liquid from the at least one settling tank upstream of the at least one cooling unit, so as to add it to the fluids to be cooled in the at least one cooling unit.

16. The system according to claim 7, wherein the system comprises a vent gas recovery system.

17. The system according to claim 7, wherein the portion of the at least one settling tank where a slurry with solid polymer particles settles is connected via a line to the reactor, so as to allow the slurry with solid polymer particles to be injected to the reactor above the distribution plate.

18. The process according to claim 1, wherein the reactor is a multi-zone reactor.

19. The process according to claim 1, wherein a slurry comprising solid polymer particles from the settling tank, is introduced to the reactor above the distribution plate.

* * * * *